United States Patent [19]
Ohashi

[11] Patent Number: 5,751,695
[45] Date of Patent: May 12, 1998

[54] ATM CELL FLOW CONTROL APPARATUS

[75] Inventor: Satoshi Ohashi, Tokyo, Japan

[73] Assignee: NEC Corporation, Tokyo, Japan

[21] Appl. No.: 712,837

[22] Filed: Sep. 12, 1996

[30] Foreign Application Priority Data

Sep. 13, 1995 [JP] Japan ................... 7-234547

[51] Int. Cl.$^6$ ................... H04L 1/22; H04J 3/06
[52] U.S. Cl. ................... 370/218; 370/232; 370/517
[58] Field of Search ................... 370/217–220, 370/252, 253, 229, 232–235, 242, 244, 395, 503, 516, 517; 375/371, 372; 395/200.55, 200.63, 200.62; 340/825.01

[56] References Cited

U.S. PATENT DOCUMENTS

| | | | |
|---|---|---|---|
| 5,237,318 | 8/1993 | Auclair et al. | 340/825.01 |
| 5,285,441 | 2/1994 | Bansal et al. | 370/517 |
| 5,301,184 | 4/1994 | Uriu et al. | 370/219 |
| 5,398,235 | 3/1995 | Tsuzuki et al. | 370/219 |
| 5,408,463 | 4/1995 | Merchant et al. | 370/218 |
| 5,475,675 | 12/1995 | Kondo et al. | 370/219 |
| 5,561,661 | 10/1996 | Edmaier et al. | 370/517 |

FOREIGN PATENT DOCUMENTS

| | | |
|---|---|---|
| 4-100451 | 4/1992 | Japan |
| 4-104635 | 4/1992 | Japan |
| 4-130838 | 5/1992 | Japan |
| 4-266241 | 9/1992 | Japan |

*Primary Examiner*—Chau Nguyen
*Attorney, Agent, or Firm*—Sughrue, Mion, Zinn, Macpeak & Seas, PLLC

[57] ABSTRACT

An ATM cell flow control apparatus includes interface sections for terminating transmission lines of two systems which constitute a redundant structure and to which identical cell sequences are supplied. Each interface section includes a cell synchronization section, a cell buffer, a policing section, and a delay control section. The cell synchronization section performs cell synchronization control of an input cell sequence and outputs the sequence in units of cells. The cell buffer performs delay adjustment of each cell output from the cell synchronization section. The policing section detects the cell interval between cells output from the cell buffer, and discards cells having a detected cell interval shorter than a predetermined cell interval. The delay control section detects the phase difference between a cell output from the cell buffer of a self-system and a cell output from the cell buffer of the other system, and controls the cell buffer in accordance with the detected phase difference.

6 Claims, 3 Drawing Sheets

ATM CELL FLOW CONTROL APPARATUS

BACKGROUND OF THE INVENTION

The present invention relates to an ATM (Asynchronous Transfer Mode) cell flow control apparatus and, more particularly, to an ATM cell flow control apparatus for performing phase control of input cell sequences from transmission lines of two systems which constitute a redundant structure and to which identical cell sequences are supplied.

ATM communication systems as transmission schemes in a B-ISDN (Broadband Integrated Services Digital Network) include a scheme of using transmission lines of two systems constituting a redundant structure to improve the reliability of the scheme such that the current transmission line is switched to the spare transmission line when the current transmission line fails. FIG. 2 shows an ATM apparatus in this case.

Referring to FIG. 2, input cell sequences from transmission lines of two systems which constitute a redundant structure and through which identical ATM cell sequences are transmitted are input to interface sections 1 and 2 of systems 0 and 1. The interface sections 1 and 2 have the same arrangement and ATM terminating functions. As shown in FIG. 2, the overall apparatus is basically constituted by cell synchronization sections 11 and 21 having ATM cell synchronization functions, delay adjustment sections 12 and 22 having cell phase adjustment functions, and alarm monitor control sections 13 and 23 having alarm monitor control functions.

The cell synchronization sections 11 and 21 identify data of the respective input cell sequences in units of fixed-length cells, and output the data to the delay adjustment sections 12 and 22 in units of cells.

The delay adjustment sections 12 and 22 perform delay adjustment of the respective cells in accordance with external control signals, and are constituted by, for example, cell buffers such as FIFO (First-In First-Out) memories. Delay adjustment is performed by controlling the read timings of the cell buffers.

Each of the alarm monitor control sections 13 and 23 detects abnormality information (AIS: Alarm Indication Signal), and inserts abnormality information upon detection of an input abnormality.

Outputs from the interface sections 1 and 2 of these two systems are selected through a selector 31 of a selection panel 3 and transmitted to an ATM apparatus (not shown) on the next stage.

This selection panel 3 includes a phase control section 32 for performing phase control of two output cell sequences. The phase control section 32 monitors the phase states of the two cell sequences for each of various cells and controls the delay amounts of the delay adjustment sections 12 and 22 of the interface sections 1 and 2 of the two systems so as to set the two cell sequences in phase.

In this manner, non-hit switching is realized in a switching operation in the redundant system.

In the conventional arrangement shown in FIG. 2, when policing sections 14 and 24 are respectively connected to the output terminals of the alarm monitor control sections 13 and 23 in the interface sections 1 and 2 of systems 0 and 1, as indicated by the dotted lines, the following problem is posed.

The policing operation will be briefly described with reference to FIGS. 3A to 3C before a description of this problem. In the policing operation, the cell interval between each self-cell (current cell) and a preceding cell is always monitored, and a self-cell is regarded as a violation cell when the cell interval is shorter (or higher) than a contract cell interval (or contract bit rate), thereby discarding it, as indicated by the dotted lines in FIGS. 3B and 3C.

For example, such a policing operation is disclosed in Japanese Patent Laid-Open Nos. 4-100451, 4-104635, 4-130838, and 4-266241.

When the policing sections 14 and 24 for performing such policing operations are added as indicated by the dotted lines in FIG. 2, since the interval between each self-cell (current cell) and a preceding cell is always monitored, different policing operations may be performed in systems 0 and 1 depending on the timings when monitoring operations are started.

FIGS. 3A to 3C show such a state. With respect to the cell sequences of the identical input data shown in FIG. 3A, system 0 starts policing at a timing t1 as shown in FIG. 3B, whereas system 1 starts policing at a timing t2 as shown in FIG. 3C. As is apparent, different cell sequence patterns are processed in the two systems.

For example, three patterns can be considered: a pattern in which no self-cell is discarded regardless of the preceding cell; a pattern in which a self-cell is discarded because the preceding cell is not discarded; and a pattern in which a preceding cell is discarded, a cell preceding the discarded cell becomes a comparative cell (reference cell), and the self-cell is not discarded but is passed because it is determined that the cell interval is long.

It is taken for granted that these three pattern occur at almost the same probability. Cell sequence fluctuations caused by these patterns are therefore determined by policing start timings. As a result, cell sequences having passed through the policing sections 14 and 24 of the two systems differ from each other in systems 0 and 1. For this reason, it is difficult to perform phase difference detecting operation in the phase control section 32 of the selection panel 3.

More specifically, when a phase control operation is performed by the phase control section 32 after policing operations, it may take time to perform coincidence detection of cell phases or unnecessary phase control may be performed because of the above result of the policing operations.

SUMMARY OF THE INVENTION

It is an object of the present invention to provide an ATM cell flow control apparatus which can easily perform proper cell phase control of two systems without being influenced by policing operations.

It is another object of the present invention to provide an ATM cell flow control apparatus control apparatus which can tune the operation of the other system to that of the self-system by causing the self-system to perform phase control of the other system even if the start timings of policing operations are different from each other.

In order to achieve the above objects, according to the present invention, there is provided an ATM cell flow control apparatus comprising interface sections for terminating transmission lines of two systems which constitute a redundant structure and to which identical cell sequences are supplied, each of the interface sections including cell synchronization means for performing cell synchronization control of an input cell sequence and outputting the sequence in units of cells, delay adjustment means for performing delay adjustment of each cell output from the cell synchronization means, cell interval detection means for detecting a cell interval between cells output from the delay adjustment means, and discarding cells having a detected cell interval shorter than a predetermined cell interval, and delay control means for detecting a phase difference between a cell output from the delay adjustment means of a self-system and a cell output from the delay adjustment means of the other system, and controlling the delay adjustment means in accordance with the detected phase difference.

DESCRIPTION OF THE PREFERRED EMBODIMENT

An embodiment of the present invention will be described below with reference to the accompanying drawings.

Figure 1:
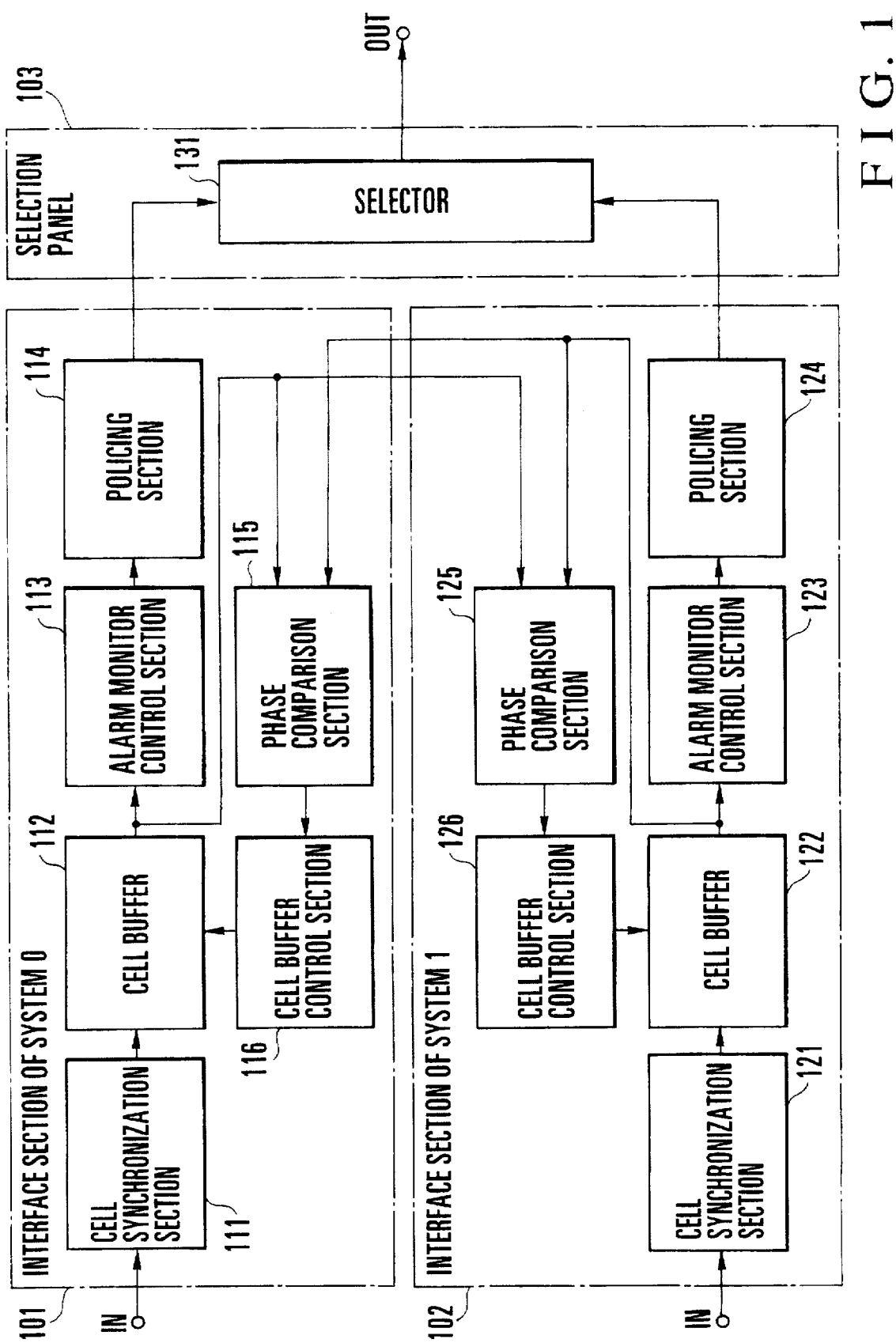
FIG. 1 is a block diagram showing an ATM cell flow control apparatus according to an embodiment of the present invention.

FIG. 1 shows an ATM cell flow control apparatus according to an embodiment of the present invention. Referring to FIG. 1, input cell sequences from transmission lines of two systems which constitute a redundant structure and through which identical ATM cell sequences are transmitted are input to interface sections 101 and 102 of systems 0 and 1. These interface sections 101 and 102 have the same arrangement and ATM terminating functions.

The interface sections 101 and 102 include cell synchronization sections 111 and 121 for identifying data of the respective input cell sequences in units of fixed-length cells and outputting the data in units of cells, thereby performing cell synchronization control, cell buffers 112 and 122 serving as delay adjustment means for performing delay adjustment by temporarily storing data from the cell synchronization sections 111 and 121 in units of cells, alarm monitor control sections 113 and 123 for performing alarm monitor control by detecting AISs from cell data output from the cell buffers 112 and 122 and inserting abnormality information in cell data when input errors occur, policing sections 114 and 124 each serving to monitor the cell interval between each cell output from a corresponding one of the alarm monitor control sections 113 and 123 and a preceding cell and discard a violation cell, phase comparison sections 115 and 125 each serving to compare the phase of one of outputs from the cell buffers 112 and 122 with that of the other of the outputs from the cell buffers 112 and 122, and cell buffer control sections 116 and 126 for controlling the delay amounts of the cell buffers 112 and 122 in accordance with the comparison outputs from the phase comparison sections 115 and 125.

The phase comparison section 115 compares the phase of an output from the cell buffer 112 of the self-system with that of an output from the cell buffer 122 of the other system. The phase comparison section 125 compares the phase of an output from the cell buffer 122 of the self-system with that of an output from the cell buffer 112 of the other system. The cell buffer control section 116 controls the delay amount of the cell buffer 112 in accordance with an output from the phase comparison section 115. The cell buffer control section 126 controls the delay amount of the cell buffer 122 of the other system in accordance with an output from the phase comparison section 125.

Figure 2:
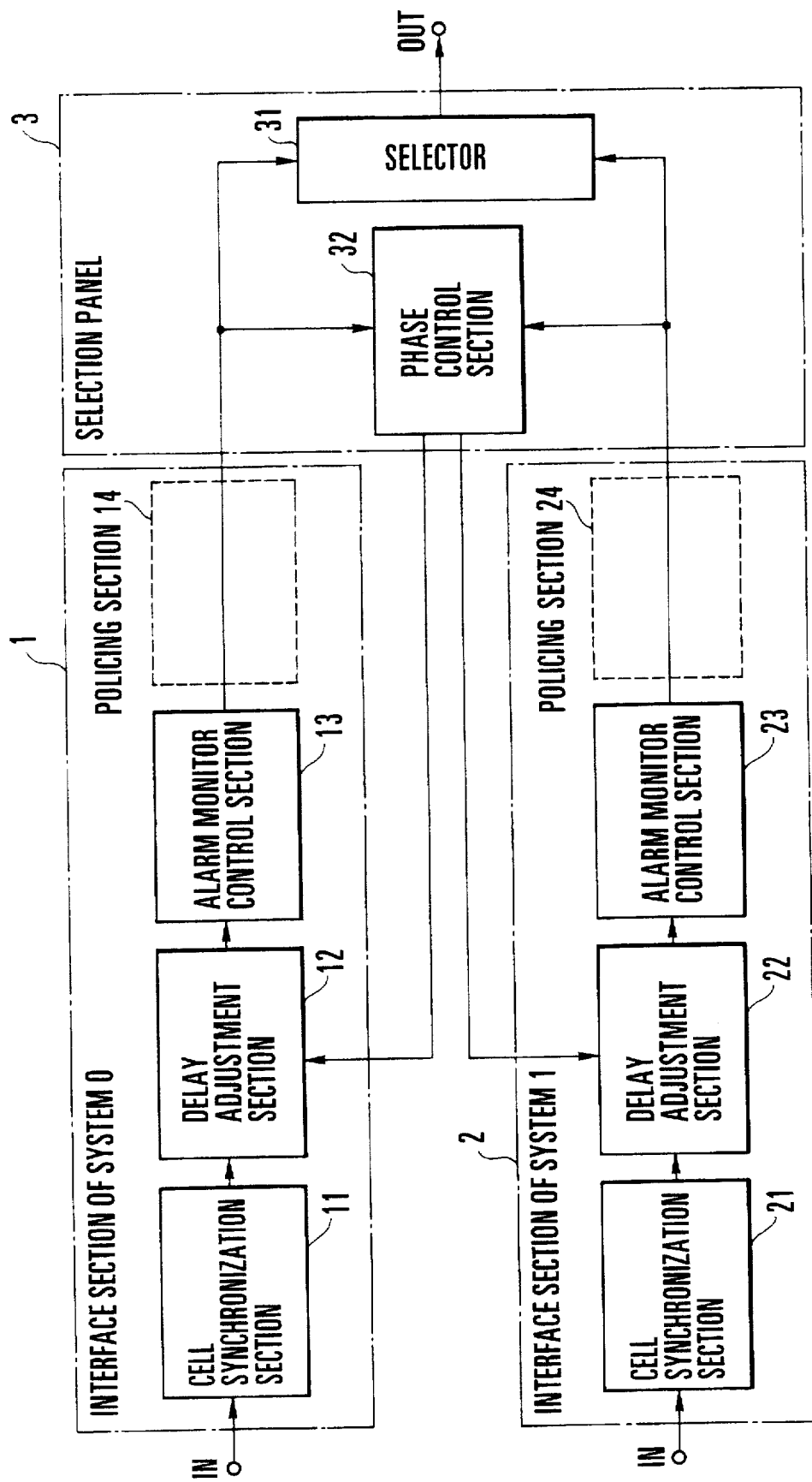
FIG. 2 is a block diagram showing a conventional ATM cell flow control apparatus.
Figures 3A, 3B, 3C:
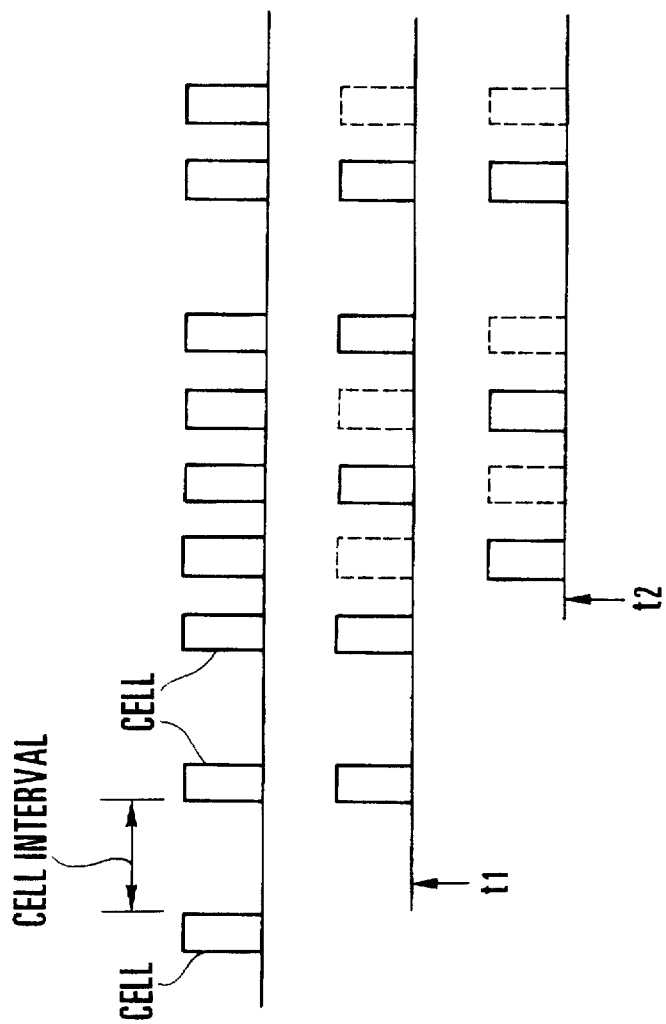
FIGS. 3A to 3C are timing charts for explaining policing functions.

Cells output from the policing sections 114 and 124 are input to a selector 131 of a selection panel 103 and selectively output from the selector 131. The selection panel 103 does not include the phase control section 32 for performing phase control of the two output systems in FIG. 2.

In this arrangement, when cell sequences are input to the interface sections 101 and 102, the cell synchronization sections 111 and 121 perform cell synchronization control for the input cell sequences and output the cell data to the cell buffers 112 and 122 in units of cells. The cell buffers 112 and 122 temporarily store the cells output from the cell synchronization sections 111 and 121. The stored cells are read out from the cell buffers 112 and 122 upon timing control by the cell buffer control sections 116 and 126. The alarm monitor control sections 113 and 123 perform predetermined alarm monitor control for the cells output from the cell buffers 112 and 122, and output the resultant cells to the policing sections 114 and 124. Each of the policing sections 114 and 124 monitors the cell interval between each input cell from a corresponding one of the alarm monitor control sections 113 and 123 and a preceding cell, discards violation cells, and outputs the resultant cells to the selector 131.

The phase comparison sections 115 and 125 detect the phase differences between the cells of the self-system and the cells of the other system on the basis of the respective cells output from the cell buffers 112 and 122, and output the resultant data to the cell buffer control sections 116 and 126. The cell buffer control sections 116 and 126 control the read timings of the cell buffers 112 and 122 so as to eliminate the phase differences detected by the phase comparison sections 115 and 125 and match the cell phases in the two systems with each other. In this case, the read timings of the cell buffers 112 and 122 are controlled by the cell buffer control sections 116 and 126 such that a delay corresponding to a phase difference is inserted in one of the systems in which phase lead has occurred.

With this operation, since the input cell phases in the policing sections 114 and 124 are always identical to each other, policing control operations are executed at the same timing. As a result, cells from the policing sections 114 and 124 are input to the selector 131 in phase, and hence non-hit switching of the transmission lines of the two systems can be performed.

As has been described above, according to the present invention, when policing functions are added to interface sections of two systems constituting redundant hardware, cell phase comparison and adjustment functions are arranged on the input side of the policing functions at positions where there are no influences of the policing functions. With this arrangement, proper cell phase control can be performed for the two systems, and transmission non-hit switching can be realized in units of cells. Therefore, in a network constituted by an ATM network, an improvement in the quality of each transmission line can be expected.

Even if policing operations are started at different timings, since phase control is performed from the self-system to the other system, the operation of the other system can be tuned to that of the self-system.

What is claimed is:

1. An ATM cell flow control apparatus comprising interface sections for terminating transmission lines of two systems which constitute a redundant structure and to which identical cell sequences are supplied.

each of said interface sections including:
- cell synchronization means for performing cell synchronization control of an input cell sequence and outputting the sequence in units of cells;
- delay adjustment means for performing delay adjustment of each cell output from said cell synchronization means;
- cell interval detection means for detecting a cell interval between cells output from said delay adjustment means, and discarding cells having a detected cell interval shorter than a predetermined cell interval; and
- delay control means for detecting a phase difference between a cell output from said delay adjustment means of a self-system and a cell output from said delay adjustment means of the other system, and controlling said delay adjustment means in accordance with the detected phase difference.

2. An apparatus according to claim 1, wherein said delay control means comprises phase difference detection means for detecting a phase difference between a cell output from said delay adjustment means of the self-system and a cell output from said delay adjustment means of the other system, and delay amount control means for controlling a cell delay amount of said delay adjustment means such that a phase difference detected by said phase difference detection means becomes zero.

3. An apparatus according to claim 1, wherein said delay control means controls said delay adjustment means to delay a cell in the self-system when a phase of the cell output from said delay adjustment means of the self-system leads a phase of a corresponding cell output from said delay adjustment means of the other system.

4. An apparatus according to claim 1, wherein said delay adjustment means comprises a cell buffer for temporarily storing a cell output from said cell synchronization means, and performs delay adjustment of the cell by controlling a read timing of the cell stored in said cell buffer.

5. An apparatus according to claim 1, further comprising selector means for switching/outputting a cell output from said cell interval detection means of the self-system and a cell output from said cell interval detection means of the other system.

6. An ATM cell flow control apparatus comprising interface sections for terminating transmission lines of two systems which constitute a redundant structure and to which identical cell sequences are supplied, and a selector section for switching/outputting cells output from said interface sections, each of said interface sections including:
- cell synchronization means for performing cell synchronization control of an input cell sequence and outputting the sequence in units of cells;
- a cell buffer whose read timing is controlled, said cell buffer temporarily storing a cell output from said cell synchronization means;
- cell interval detection means for detecting a cell interval between cells output from said cell buffer, and discarding cells having a detected cell interval shorter than a predetermined cell interval, the cell output from said cell interval detection means being output to said selector section;
- phase difference detection means for detecting a phase difference between a cell output from said cell buffer of a self-system and a cell output from said cell buffer of the other system; and
- cell buffer control means for controlling a read timing of said cell buffer in accordance with a detected phase difference.

* * * * *